US006231913B1

(12) United States Patent
Schwimmer et al.

(10) Patent No.: US 6,231,913 B1
(45) Date of Patent: May 15, 2001

(54) FOOD PRODUCT DRESSINGS AND METHODS FOR PREPARING FOOD PRODUCT DRESSINGS

(75) Inventors: William Schwimmer, Evanston; Marlene Stanford, Highland Park; Steve Hill, Prospect Heights; Anil Kumar Gaonkar, Buffalo Grove, all of IL (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/260,739

(22) Filed: Feb. 26, 1999

Related U.S. Application Data
(60) Provisional application No. 60/076,390, filed on Feb. 28, 1998.

(51) Int. Cl.[7] .................................................. A23L 1/24
(52) U.S. Cl. ........................ 426/605; 426/601; 426/613
(58) Field of Search .................................. 426/613, 601, 426/605

(56) References Cited

U.S. PATENT DOCUMENTS

| | | | |
|---|---|---|---|
| 4,140,808 | 2/1979 | Jonson | 426/583 |
| 4,352,832 | 10/1982 | Wood | 426/613 |
| 4,423,084 | 12/1983 | Trainor | 426/613 |
| 4,612,197 | 9/1986 | Postner | 426/613 |
| 4,762,726 | 8/1988 | Soucie | 426/613 |
| 5,011,701 | 4/1991 | Baer et al. | 426/573 |
| 5,087,471 | 2/1992 | Combes et al. | 426/589 |
| 5,137,742 | 8/1992 | Bakal | 426/589 |
| 5,387,428 | 2/1995 | Chapman | 426/613 |
| 5,773,072 | 6/1998 | Campbell | 426/613 |
| 5,795,614 | 8/1998 | Krishnamurthy | 426/613 |
| 5,837,308 | 11/1998 | Campbell | 426/613 |
| 5,932,276 | 8/1999 | Bhatia | 426/613 |

OTHER PUBLICATIONS

Lowe 1937 Experimental Cookery 2nd edition John Wiley & Sons New York p. 266–287.*
Encyclopedia of Emulsion Technology, vol. 1 Basic Theory, edited by Paul Becher, "Formation of Emulsions", Pieter Walstra/Agricultural University, Wageningen, The Netherlands; pp. 58–123, pp. 126–127.

*Emulsion Science,* Edited by Philip Sherman, Unilver Research Laboratory, The Frythe, Welwyn, Hertfordshire, England; pp. 285–349, Academic Press, London and New York, 1968.

"Stability of Oil–in–Water Emulsions.2. Effects of Oil Phase vol., Stability Test, Viscosity, Type of Oil and Protein Additive"; J.C. Acton and R.L. Saffle, Dept. of Food Science, University of Georgia, Athens, GA 30601, *Journal of Food Science,* pp. 1118–1120, vol. 36 (1971).

Dechema–Monographien Nr. 1505–1536; Lebensmittel–Einfluss Der Rheologie, "Influence of rehological properties of both phases on droplet size of O/W emulsions obtained by homogenization and similar processes", P. Walstra, Wageningen, The Netherlands, pp. 87–94; Verlag Chemie, GMBH, Weinheim/Bergstrasse, 1974.

Protein based emulsifiers for production of mayonnaise, by Lars Daugaard, *Scandinavian Dairy Information,* pp. 52–54, 1/93.

*Emulsions and Droplet Size Control,* Eric Dickinson, Procter Department of Food Science, University of Leeds, England, pp. 1–43, Nov. 1991.

Abstract:"Emulsifiers for Mayonnaise Production", L. Daugaard, *Food–Marketing–& –Technology,* 1993.

\* cited by examiner

*Primary Examiner*—Carolyn Paden
(74) *Attorney, Agent, or Firm*—Fitch, Even, Tabin & Flannery

(57) ABSTRACT

The present invention provides oil-in-water emulsion food product dressings and a method for preparing oil-in-water emulsion food product dressings. The method achieves an increase in the viscosity and, hence, the stability, of the food product dressings, which permits the food product dressings to achieve a desired level of viscosity with the use of smaller quantities of oil. This advantageously permits the production of reduced calorie oil-in-water emulsion food product dressings at a reduced cost.

34 Claims, 1 Drawing Sheet

FOOD PRODUCT DRESSINGS AND METHODS FOR PREPARING FOOD PRODUCT DRESSINGS

This application is based on, and claims benefit of, U.S. Provisional Application Serial No. 60/076,390, which was filed in the United States Patent and Trademark Office on Feb. 28, 1998.

FIELD OF THE INVENTION

The present invention relates to food product dressings and to methods for preparing food product dressings. In particular, the present invention relates to food product dressings which are oil-in-water emulsions having an aqueous external phase and an oil internal phase, methods for preparing these food product dressings, and methods for increasing the viscosity and physical stability of these food product dressings.

BACKGROUND OF THE INVENTION

Many salad dressings, vegetable dips, sauces, and other pourable or spoonable food products are oil-in-water emulsions, which may have different product properties, such as viscosity, physical stability or Theological (flowing) behavior. An emulsion is a preparation established with the use of an emulsifying agent of a deformable liquid (the internal or discontinuous phase) distributed in small globules throughout the body of a second liquid (the external or continuous phase). The continuous phase of the emulsion forms a layer adsorbed around the globules of the discontinuous phase. This modifies the forces of cohesion between these globules, and the forces between these globules and the continuous phase. The globules of the discontinuous phase are held together by London-van der Walls attraction forces, and often form aggregates. Usually, the emulsifier is dissolved, or dispersed, in the continuous phase. An oil-in-water emulsion has oil as the discontinuous phase and an aqueous solution as the continuous phase.

It is beneficial to increase the viscosity of spoonable or pourable oil-in-water emulsion food products because such an increase in the viscosity permits the food products to achieve a desired level of viscosity (i.e., a desired degree of friction between component molecules as they slide by one another) with the use of smaller quantities of oil. The reduced quantity of oil which becomes necessary for the preparation of these food products advantageously results in a cost savings for preparing the food products and, thus, in reduced-cost food products. Additionally, the viscosity of oil-in-water emulsion food products is generally positively correlated with the physical stability of the food products. Thus, oil-in-water emulsion food products having a higher viscosity will generally also be more stable. It is beneficial to control the stability and rheology of food products which are oil-in-water emulsions because such control permits the preparation of food products having enhanced flavor and texture qualities.

Using the formulations, processing steps, and conditions of the methods described herein, in which specified amounts of specified ingredients are processed in specified orders at specified temperatures and reaction conditions, the viscosity of oil-in-water emulsion food products can advantageously be increased beyond the viscosity which would otherwise have been achieved for the food products. This increase in the bulk viscosity can surprisingly be accomplished by lowering, rather than by increasing, the viscosity of the continuous phase (i.e., the serum phase) of the emulsion. In the conventional preparation of oil-in-water emulsions, in contrast, the bulk viscosity of a the oil-in-water emulsion is generally increased by increasing, rather than by decreasing, the viscosity of the continuous phase of the emulsion. Such an increase in such conventional systems is normally achieved by adding hydrocolloids, carbohydrates or similar materials to the continuous phase of the emulsion. These materials bind the water and, thereby, increase the viscosity of the continuous phase, and of the final oil-in-water emulsion.

Because the oil-in-water emulsion food product dressings of the present invention achieve a desired level of viscosity (and physical stability) with the use of smaller quantities of oil than that which would normally be required, the costs for producing these dressings is advantageously reduced.

SUMMARY OF THE INVENTION

The present invention provides food product dressings and methods for making such food product dressings. The bulk viscosities of the food product dressings of this invention are achieved by lowering, rather than by increasing, the viscosity of the continuous phase (i.e., the serum phase) of the emulsion. More specifically, the present invention provides a food product dressing prepared by a process comprising:

(a) preparing a composition of (1) from about 0.15 to about 1.0 weight percent of a suspending agent; (2) from about 0.5 to about 25 weight percent of a dairy source, wherein the temperature of the diary source ranges from about 35° F. to about 80° F.; (3) from about 0.05 to about 3.5 weight percent of an edible acid, wherein the edible acid maintains the pH of the dressing at below about 4.0; (4) from about 0 to about 0.5 weight percent of an emulsifier; (5) from about 15 to about 95 weight percent of water, wherein the temperature of the water ranges from about 35° F. to about 80° F.; (6) from about 0.50 to about 5.0 weight percent of egg yolk; (7) from about 0 to about 20 weight percent of sugar; (8) from about 0 to about 10 weight percent of salt; and (9) from about 0 to about 15 weight percent of spices and natural or artificial flavors, wherein the temperature of the composition remains from about 50° F. to about 80° F.; (b) mixing the composition of (a) for a period of time which is sufficient to hydrate the suspending agent to become hydrated, wherein the temperature of the composition during the mixing remains from about 50° F. to about 80° F.; (c) adding from about 10 to about 80 weight percent of an oil to the mixed composition of (b) to form a pre-emulsion, wherein the temperature of the oil ranges from about 35° F. to about 80° F., and wherein the temperature during the addition remains from about 50° F. to about 80° F.; and (d) emulsifying the pre-emulsion to form an oil-in-water emulsion, wherein the temperature during the formation of the oil-in-water emulsion remains from about 50° F. to about 80° F.

The present invention also provides a method for preparing a dressing for food products, said method comprising: (a) preparing a composition of (1) from about 0.15 to about 1.0 weight percent of a suspending agent; (2) from about 0.5 to about 25 weight percent of a dairy source, wherein the temperature of the dairy source ranges from about 35° F. to about 80° F.; (3) from about 0.05 to about 3.5 weight percent of an edible acid, wherein the edible acid maintains the pH of the dressing at below about 4.0; (4) from about 0 to about 80 weight percent of an emulsifier; (5) from about 15 to about 95 weight percent of water, wherein the temperature of the water ranges from about 35° F. to about 80° F.; (6)

from about 0.5 to about 5.0 weight percent of egg yolk; (7) from about 0 to about 20 weight percent of sugar; (8) from about 0 to about 10 weight percent of salt; and (9) from about 0 to about 15 weight percent of spices and natural or artificial flavors, wherein the temperature of the composition remains from about 50° F. to about 80° F.; (b) mixing the composition of (a) for a period of time which is sufficient to hydrate the suspending agent, wherein the temperature during the mixing remains from about 50° F. to about 80° F.; (c) adding from about 10 to about 80 weight percent of an oil to the mixed composition of (b) to form a pre-emulsion, wherein the temperature of the oil ranges from about 35° F. to about 80° F., and wherein the temperature during the addition remains from about 50° F. to about 80° F.; and (d) emulsifying the pre-emulsion to form an oil-in-water emulsion, wherein the temperature during the formation of the oil-in-water emulsion remains from about 50° F. to about 80° F.

By controlling the temperature of the composition within the specified ranges during both the suspending agent (i.e., gum) hydration step and the emulsification step, the bulk viscosity of the resulting composition is increased while the viscosity of the continuous or serum phase is decreased. Moreover, the amount of oil required is significantly reduced. Generally, the temperature during hydration is maintained at about 50° F. to about 80° F.; and the temperature during emulsification is also maintained at 50° F. to about 80° F.

BRIEF DESCRIPTION OF THE DRAWINGS

FIG. 1A plots process temperatures (from 70° F. to 130° F.) on the horizontal axis and weight percent of oil needed to reach a target viscosity of 8000 centipoise (from 53 percent to 60 percent) on the vertical axis. FIG. 1B plots process temperature (from 50° F. to 120° F.) on the horizontal axis and viscosity (from 5000 to 9000 centipoise) on the vertical axis.

DETAILED DESCRIPTION OF THE PREFERRED EMBODIMENTS

Figure 1A:
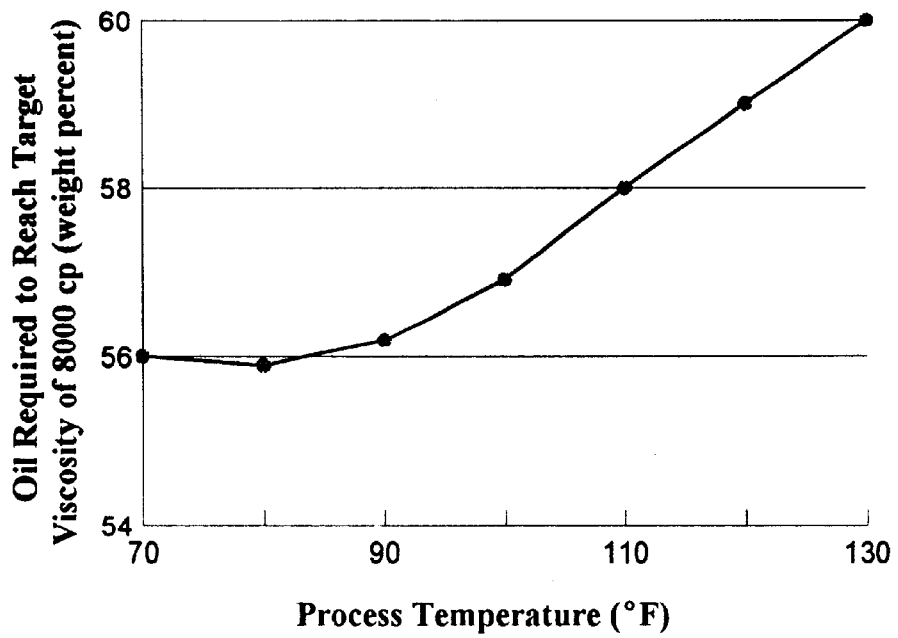
FIGS. 1A and 1B are graphs showing the results of the experiments performed in Example 4.

The present invention provides oil-in-water emulsion food product dressings prepared in a manner which increases the viscosity of the dressings and, hence, the physical stability of the dressings, in comparison with the viscosity of conventional oil-in-water emulsion dressings prepared by conventional processes. The present invention also provides a method for preparing such oil-in-water emulsion food product dressings.

The terms "dressing" or "food product dressing" as used herein in connection with the present invention mean any dressing, sauce, dip or other pourable or spoonable edible food product which is an oil-in-water emulsion having an aqueous, external phase and an oil internal phase, and which has a total fat content of at least about 10 percent of the total weight of the dressing (i.e., it is not a no-fat or very low-fat product). It includes a wide variety of salad dressings, vegetable dips, sauces and the like, such as, for example, Kraft Foods, Inc. (Northfield, Ill.) full-fat Ranch salad dressing. The food product dressings of the present invention generally have bulk viscosities in the range of about 6000 to about 12000 centipoise at room temperature, preferably in the range of about 7500 to about 8500 centipoise at room temperature, and more preferably in the range of about 8300 to 8500 centipoise at room temperature.

Preparative Procedures

The food product dressings of the present invention may generally be prepared in batch, semi-continuous, or continuous processes by: (a) preparing a mixture of the ingredients described herein at the levels described herein; (b) mixing the ingredients of step (a) for a period of time sufficient to permit the suspending agent employed in the mixture to become hydrated (i.e., the hydration step); (c) adding oil to the mixture of step (b); and (d) forming an oil-in-water emulsion from the oil and the mixture of step (b) (i.e., the emulsification step). The mixture of step (a) is prepared by simply adding the ingredients described herein together in the amounts specified herein. To achieve the desired properties of the present invention, the temperature during both the hydration step and the emulsification step must be controlled and maintained in the range of about 50° F. to about 80° F.

More specifically and preferably, in order to increase the viscosity of the food product dressings, the temperature of the mixture before (i.e., step (a)) and during (i.e., step (b)) the hydration step should also remain from about 50° F. to about 80° F. The temperature of the dairy source and water employed in the mixing step to form the mixture should be at, or cooled to, a temperature from about 35° F. to about 80° F. The preferred temperatures for the mixture and/or added ingredients and/or the hydration step range from about 60° F. to about 75° F., with from about 65° F. to about 70° F. being most preferred. Mixing temperatures and/or dairy source or water temperatures and/or hydration step temperatures exceeding about 80° F. will generally have an adverse effect upon the viscosity of the food product dressings (i.e., they will result in a food product dressing having a lower viscosity). Thus, they (especially the hydration step temperature in excess of about 80° F.) should be avoided.

As described in more detail below, a higher viscosity of the food product dressings will generally be achieved when the suspending agent is added during the process for preparing the dressings prior to adding other solutes, and when the suspending agent is added alone, rather than as a blend with other solutes. In order to produce food product dressings which are stable against mold growth and invasion of other microorganisms, an acid source is preferably added during this mixing step in an amount which is sufficient to maintain the pH of the food product dressings (i.e., the final product) below about 4.0.

The mixing of step (b) can be performed with any of a wide variety of standard mixing equipment known by those of skill in the art. In order to increase the viscosity of the food product dressings, the mixing of the ingredients should be performed for a period of time which is sufficient to allow the suspending agent to become hydrated; generally, a hydration time of at least about 1 minute, preferably 2 minutes or longer, is sufficient; longer or shorter hydration times may also be used so long as hydration is essentially complete. The mixture or composition should remain at a temperature ranging from about 50° F. to about 80° F. during this mixing or hydration step, preferably from about 60° F. to about 75° F., and most preferably from about 65° F. to about 70° F. Mixing times of less than about 2 minutes where hydration is not complete and/or mixing temperatures above about 80° F., will generally have an adverse effect upon the viscosity of the food product dressings (i.e., the food product dressings will have a lower viscosity) and, thus, should be avoided.

Since the temperature during hydration and emulsification is controlled in the present invention, it is generally preferred that temperature of any added ingredients be less than about 80° F.; more preferably, the temperature of added ingredients is preferably close to or essentially at the same temperatures at which the hydration step and/or the emulsification step are carried out. Thus, for the same reasons as discussed above, the temperature of the oil added to the mixture of step (b) in step (c) should range from about 35° F. to about 80° F., and the temperature during the addition of the oil to the mixture of step (b) to form the pre-emulsion, should range from about 50° F. to about 80° F., preferably from about 60° F. to about 75° F., and most preferably from about 65° F. to about 70° F. The oil may be added to the mixture of step (b) to form the pre-emulsion by any of a variety of standard methods known by those of skill in the art. One preferred method involves injection of the oil into the mixture with a suitable injection device.

The pre-emulsion (i.e., the mixture formed from the oil and mixture of step (b)) can be formed into an oil-in-water emulsion using standard emulsification equipment known by those of skill in the art, such as a high-pressure, ultrasonic, or other homogenizer, a rotator/stator device, and like equipment. The pressure employed, the shear rate, and/or the time of emulsification may vary widely depending upon the particular equipment employed. The pressure employed when homogenizers are used for the emulsification will generally range from about 130 psi to about 220 psi, with about 180 psi being preferred. When equipment other than homogenizers are used for the emulsification, the shear rate employed will generally range from about 9,000 to about 100,000 reciprocal seconds. The emulsification time will generally range from about 1 second to about 10 minutes, but may be higher, depending upon whether the emulsification is performed in a single pass, or in multiple passes, and will more usually range from about 2 seconds to about 30 seconds.

The average droplet size (mean volume diameter) of the globules formed by the oil phase of the emulsion can be controlled by methods known by those of skill in the art and will preferably range in size from about 0.5 $\mu$m to about 100 $\mu$m; preferably the average droplet size is in the range of about 1 $\mu$m to about 10 $\mu$m. Examples of such methods include the use of different types of emulsifiers, the use of different shear rates or pressures, the use of different equipment, and the like. Droplet size distribution can be measured by known methods, such as by the methods described in Walstra, *J. Colloid Interface Sci.* 27, 493 (1968); Walstra, *Neth. Milk Dairy J.* 23, 12 (1969); and Walstra, *J. Colloid Interface Sci.* 29, 424 (1969). It has been discovered that the globules formed by the oil phase of the oil-in-water emulsion food product dressings of the invention often form aggregates of individual globules, which generally range in size from about 1 $\mu$m to about 100 $\mu$m.

The oil-in-water emulsions produced can be evaluated for physical stability using known methods, such as, for example, the procedure described by Titus et al., "Emulsifier Efficiency in Model Systems of Milk Fat or Soybean Oil and Water", *Food Technology* 22:1449 (1968); and by Acton et al., "Stability of Oil-in-Water Emulsions. 1. Effects of Surface Tension, Level of Oil, Viscosity and Type of Meat Protein," *J. Food Sci.*, 35:852 (1970). The viscosity of the oil-in-water emulsions produced (relative to water) can be measured, for example, using known methods and standard equipment, such as a Brookfield Synchro-Lectric Viscometer. Additional information concerning the formation and testing of oil-in-water emulsions is present in Becher, *Encyclopedia of Emulsion Technology* (Volume 1, Basic Theory, Marcel Dekker, Inc., New York (1983), and Sherman, *Emulsion Science* (Academic Press, New York (1968)).

Ingredients

The food product dressings of the invention are prepared using a combination of the ingredients described below in the amounts described.

Suspending Agent

A wide variety of edible suspending agents which have a negative charge may be employed to prepare the food product dressings of the present invention. These include, for example, various gums, carrageenans, and alginates, such as, for example, xanthan gum, and propylene glycol alginate. Generally gums are preferred and xanthan gum is the most preferred. The suspending agent interacts with the egg yolk ingredient of the food product dressings to form a complex, which increases the stability of the dressings. By "xanthan gum" is meant the heteropolysaccharide produced by fermentation of the microorganism of the genus Xanthonioiias. A discussion of the physical and chemical properties of xanthan gum is present in Whistler, *Industrial Gums* (Ed., Academic Press, N.Y. (1973)). Xanthan gum in aqueous solution with an appropriate counterion, such as sodium or potassium, is highly negatively charged because its side chains are composed of charged glucuronic acid, mannose and its pyruvate derivative. In aqueous solution, the highly charged, mutually repelling, and relatively bulky side chains regularly disposed along the relatively narrow backbone, are believed to provide hydrated xanthan gum having a relatively linear structure.

The amount of suspending agent used to prepare the food product dressings of the invention ranges from about 0.15 to about 1.0 percent of the total weight of the dressings, and preferably ranges from about 0.2 to about 0.5 percent. Within these ranges, a greater increase in the viscosity, and in the emulsion stability, of the dressings is achieved when a larger quantity of suspending agent is employed.

As is discussed in Example 5, it is preferable to add the suspending agent during the process of preparing the food product dressings of the invention prior to the addition of other solutes, and alone, rather than as a blend with other solutes, because the suspending agent and the solutes appear to compete for available water.

Dairy Source

A wide variety of dairy sources or dairy-derived materials may be employed to prepare the food product dressings of the present invention and include, for example, non-fat dry milk, non-fat liquid milk, dry buttermilk, liquid buttermilk, dry skim milk, liquid skim milk, dry 2% fat milk, liquid 2% fat milk, dry whole fat milk, and liquid whole fat milk. If the dairy source has been pasteurized, or otherwise heated, the dairy source should be cooled to about 80° F. or below prior to using the dairy source in the preparation of the dressings of the invention. The use of a dairy source in the preparation of the dressings which is at a temperature above about 80° F. will generally significantly reduce the viscosity of the dressings. The dairy source should also be in a liquid state (i.e., not frozen), which will generally be at or above about 35° F.

The amount of dairy source material used to prepare the dressings of the invention ranges from about 0.5 to about 25 percent of the total weight of the dressings, and preferably ranges from about 1 percent to about 15 percent, with about 1.5 percent being most preferred.

Edible Acids

The use of an edible acid (i.e., a food-grade acid), or a mixture of edible acids, as a preservative in the food product dressings of the present invention provides microbial stability to the dressings. Any of a wide variety of edible acids, mixtures thereof, salts thereof, or similar preservatives, can be used to prepare the dressings of the invention and include, for example, sorbic acid (or salts thereof), phosphoric acid (or salts thereof), lactic acid (or salts thereof, potassium sorbate, and vinegar, each of which inhibit the growth of molds, or mixtures thereof In addition to inhibiting mold growth, these substances may also impart a desirable flavor to the dressings.

The amount of the edible acid which may be employed in the dressings generally ranges from about 0.05 to about 3.5 percent of the total weight of the dressings, and preferably ranges from about 2.5 percent to about 3 percent, with about 2.7 percent being most preferred. A sufficient amount of the edible acid should be employed in the preparation of the food product dressings to maintain the pH of the dressings below about 4.0. If such a pH for the dressings is not maintained, the microstability of the dressings (the ability of the dressings to be stored for periods of time without the growth of various molds, or the invasion of other undesirable microorganisms) will be significantly reduced.

Emulsifiers

Emulsifiers suitable for use in this invention are generally any hydrophilic emulsifiers having a HLB value greater than about 8 so long as the emulsifier is suitable for food applications and does not impart undesirable properties to the food product dressing. Such emulsifiers include, for example, polysorbates (any of a variety of esters of sorbitol and its anhydrides condensed with polymers of ethylene oxide, such as Polysorbates 20, 40, 60 or 80), polyglycerol esters, sugar esters, sorbitan esters, and the like. Generally, the polysorbates are preferred.

The amount of emulsifiers (e.g., polysorbates) which may be used to prepare the dressings of the invention ranges from about 0 to about 0.5 percent of the total weight of the dressings, and preferably ranges from about 0.05 percent to about 0.3 percent, with about 0.1 percent being most preferred. By varying the amount of emulsifier, the viscosity of the resulting product can be controlled and adjusted over a fairly wide range. (Egg and diary proteins, which can range up to about 5 percent of the composition, can also act as emulsifiers. For purposes of this invention, however, such proteins are not included within the term "emulsifier" as used in the claims but are, rather, considered as separate components.)

Water

The amount of water used to prepare the food product dressings of the invention ranges from about 15 to about 95 percent of the total weight of the dressings, and preferably ranges from about 20 percent to about 80 percent, more preferably from about 20 percent to about 30 percent, with about 23 percent being most preferred.

The temperature of the water used to prepare the dressings of the invention can .affect the bulk viscosity of the resulting dressings. Water temperatures above about 80° F. generally cause a significant and undesirable variability in the viscosity of the dressings. The temperature of the water employed to prepare the dressings of the invention, therefore, should generally be no higher than about 80° F. In addition, the water used to prepare the dressings should be in a liquid state (i.e., not frozen). Thus, the temperature of the water used to prepare the dressings should generally range from about 35° F. to about 80° F., and preferably ranges from about 60° F. to about 75° F., with from about 65° F. to about 75° F. being most preferred.

Egg Yolk

A variety of sources of egg yolk may be employed to prepare the food product dressings of the invention. The protein and lipoproteins from egg yolk functions as an emulsifier, and also contributes a desirable flavor to the dressings. Sources of egg yolk include, for example, non-salted egg yolks, salted egg yolks, and egg yolk powder. The egg yolk may be the only emulsifiers present in the food product dressing of this invention. It is generally preferred, however, that other emulsifiers are also present.

The amount of egg yolk used to prepare the food product dressings of the invention generally ranges from about 0.5 to about 5.0 percent of the total weight of the dressings, and preferably ranges from about 3.0 percent to about 5.0 percent, with about 3.0 percent being preferred. Within these ranges, a greater increase in the viscosity, and in the emulsion stability, of the dressings have been found to be achieved when a larger quantity of egg yolk is employed. By varying the amount of egg yolk, the viscosity of the resulting product can be controlled and adjusted over a fairly wide range.

Oil

The oil which may be employed to prepare the food product dressings of the invention may be any of a wide variety of edible oils, such as soybean oil, corn oil, safflower oil, sunflower oil, peanut oil, olive oil, canola oil, cottonseed oil, palm oil, coconut oil, fish oil, lard oil, and castor oil. Soybean oil is generally preferred.

For the same reasons discussed above for the dairy source and water, the temperature of the oil should generally not be higher than about 80° F. Further, the oil should also be in a liquid state (i.e., not frozen), which will generally be at 35° F. or above. It is preferable that the temperature of the oil, water, and dairy source all be approximately the same and be in the range of about 50° F. to about 80° F., preferably from about 60° F. to about 75° F., and most preferably from about 65° F. to about 70° F.

The amount of oil used to prepare the food product dressings of the invention generally ranges from about 10 to about 80 percent of the total weight of the dressings, and preferably ranges from about 25 percent to about 65 percent, with about 53 percent being most preferred.

Other Ingredients

Various optional food ingredients can be added if desired. Generally it is preferred to include some or all of these optional ingredients in the products of this invention.

Sweeteners

Sweeteners may, optionally, be employed in the food product dressings of the invention in an amount ranging from about 0 to about 20 percent of the total weight of the dressings, and preferably ranging from about 2 percent to about 10 percent, with about 4.5 percent being most preferred. While liquid sugar is the preferred sweetener for use in the dressings, other sweeteners, such as dextrose, fructose, glucose, mannose, galactose, xylose, sorbose, tagatose, ribulose, xylulose, maltose, lactose, cellobiose, raffinose, erythritol, mannitol, lactitol, sorbitol, xylitol, light or dark corn syrup, and synthetic sweeteners, may also be employed.

Salt

Salt may, optionally, be employed in the food product dressings of the invention in an amount ranging from about 0 to about 10 percent of the total weight of the dressings, and preferably ranging from about 1 percent to about 5 percent, with about 2.3 percent being most preferred.

Spices and Other Flavors

A wide variety of spices and natural or artificial flavors may, optionally, be employed in the food product dressings of the invention in an amount ranging from about 0 to about 15 percent of the total weight of the dressings, and preferably ranging from about 2 percent to about 10 percent, with about 2.5 percent being preferred. Examples of spices which may be employed in the dressings of the invention include pepper, garlic powder, onion powder, parsley granules, and the like. Examples of flavors which may be employed in the dressings include natural onion flavors, dairy flavors, natural ranch flavor, natural garlic flavor, lemon juice or lemon juice concentrate, vinegar, and the like. As those skilled in the art will realize, other spices and/or flavors can be used in the present invention if desired.

The following Examples describe and illustrate the methods for the preparation of food product dressings within the present invention. These Examples are intended to be merely illustrative of the present invention and not to limit it. Those of skill in the art will readily understand that variations of certain conditions and/or steps employed in the procedures described in these Examples can be used to prepare and test these dressings. All materials and equipment employed in the Examples, and generally employed to make and use the food product dressings of the present invention, are commercially-available from sources known by those of skill in the art. Throughout the specification and examples, all percentages are by weight unless specified otherwise.

EXAMPLE 1

Preparation of Salad Dressing

A pourable oil-in-water emulsion salad dressing having the ingredients listed below was prepared in a batch process as described below.

| Ingredient | Weight Percent of Final Dressing |
| --- | --- |
| Cultured Skim Buttermilk | 15.0% |
| Vegetable Oil | 63.0% |
| Salted Egg Yolks | 3.0% |
| Polysorbate 60 | 0.2% |
| Xanthan Gum | 0.3% |
| Food-grade Acids | 1.6% |
| Sugar | 3.0% |
| Salt | 1.5% |
| Water | 8.4% |
| Spices/Flavors | 4.0% |
| TOTAL | 100% |

Formation of Contintious Phase

The cultured skim buttermilk was pasteurized and acidified by standard methods, and allowed to cool to about 40° F. The cooled, pasteurized, and acidified cultured skim buttermilk was then mixed with the water, salt, and sugar for approximately two minutes in a commercially-available agitated vessel. The temperature of the slurry formed was maintained at about 60° F. The xanthan gum and polysorbate 60 were added to the mixture, and then the salted egg yolks were added to the resulting mixture. This mixture was mixed for a period of time which was sufficient to allow the xanthan gum to be hydrated (about two minutes) while maintaining the temperature at about 60° F.

Formation of Pre-Emulsion

Vegetable oil was then added to the above mixture and mixed for about 2 minutes. Then the edible acids were added and mixed into the mixture to form a pre-emulsion. The temperature was maintained at about 60 to 65° F. throughout the operation.

Formation of Emulsion

The above pre-emulsion was emulsified using an APV Gaulin Homogenizer (Wilmington, Mass.) for a period of about 10 seconds at a temperature of about 65° F. Spices were then mixed into the resulting emulsion to provide a pourable salad dressing with a viscosity at room temperature of about 8500 centipoise.

EXAMPLE 2

Preparation of Ranch Salad Dressing

A pourable oil-in-water emulsion Ranch salad dressing having the ingredients listed below was prepared in a batch process as described below.

| Ingredient | Weight Percent of Final Dressing |
| --- | --- |
| Soybean Oil | 53.0% |
| Water | 29.3% |
| Non-Fat Dry Milk | 1.5% |
| Xanthan Gum | 0.25% |
| Spices/Flavors | 4.75% |
| Egg Yolk | 3.0% |
| Food-Grade Acids | 3.0% |
| Sugar | 3.0% |
| Salt | 2.0% |
| Polysorbate 60 | 0.2% |
| TOTAL | 100% |

Formation of Continuous Phase

The following dry ingredients were placed into an eductor mixer system in the order shown below, such that the xanthan gum was present in the bottom of the mixer, and the non-fat dry milk was on top of the xanthan gum, and the dry spices/flavors were on top of the non-fat dry milk:

Xanthan gum (Added first; bottom layer)

Non-Fat Dry Milk (Added second; middle layer)

Dry Spices/Flavors (Added last; top layer).

In a separate mixer tank (equipped with high speed agitation), water (at a temperature between 60° F. and 75° F.), sugar, and salt were mixed. This liquid composition was then recirculated through the eductor mixer system to combine and mix the various ingredients. Once transfer was complete, mixing continued for an additional minute at which time the edible acids were added to the mixer chamber with additional mixing. After one minute of additional mixing, all remaining ingredients were added to form the pre-emulsion; the added oil was at a temperature of about 75° F. The pre-emulsion was then processed through a rotor-stator emulsification device at a temperature of about 70° F. High agitation was continued until an emulsion formed. The resulting emulsion had a viscosity of about 8500 centipoise at room temperature.

EXAMPLE 3

Production of Salad Dressings at Different Process Temperatures

Figure 1B:
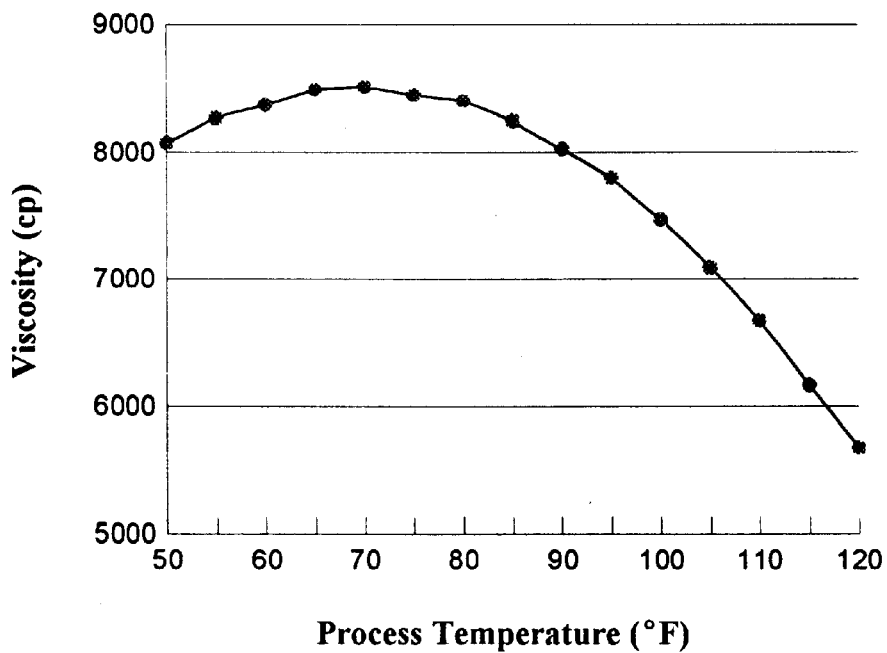

In one set of experiments, a salad dressing was prepared in the same manner as described in Example 2 except that the process temperature was varied between 50° F. and 130° F. In another set of experiments, the percent of oil required to reach a target viscosity of 8000 centipoise was determined, and the viscosity of the final product was measured. The results of these experiments are illustrated graphically in FIGS. 1A and 1B. For process temperature greater than about 80° F., the percent of oil required to reach the target viscosity started increasing significantly. With process temperature greater than about 80° F., the viscosity of the final salad dressing product decreased significantly.

EXAMPLE 4

Variation of Method and Order of Addition of Xanthan Gum During Process, and of Process Temperatures A series of experiments were performed in which salad dressings were prepared in batch processes using an APV Gaulin Homogenizer (Wilmington, Mass.) to form the oil-in-water emulsions. The procedures and ingredients used, except as noted, were substantially the same as described in Example 1. In this Example, the following procedural variations were examined: (1) the order of addition of xanthan gum during the process relative to the other ingredients; (2) the method of adding xanthan gum during the process (i.e., alone or in a blend with sugar); or (3) the process temperature.

Three different experimental protocols were used. The ingredients were added in different orders in Trials A, B, and C below. For Trial A, the order of addition is the same as the order of ingredient listed below. The order of addition in Trials B and C were modified as indicated below.

Trial A:

The ingredients in this trial were added in the following order:

(1) Water (added first);
(2) Cultured buttermilk;
(3) Dry spice/flavor ingredients;
(4) Liquid flavor ingredients;
(5) Egg yolks;
(6) A slurry of xanthan gum, Polysorbate 60, and soybean oil (about 20 percent of the total oil);
(7) Remainder of oil (about 80 percent); and
(8) Remainder of ingredients (added last).

Trial A was performed twice, once under "hot processing conditions"(i.e., buttermilk, heated to 175° F., was added without cooling), and once under "cold process conditions" (i.e., buttermilk, heated to 175° F., was cooled to approximately 40° F. in a jacketed kettle before addition).

Trial B:

Trial B had the same ingredients added in the same order as described for Trial A, except that the xanthan gum was added with the dry flavor ingredients (i.e., instead of be added as ingredient No. (6), the xanthan gum was added at the same time as ingredient No. (3) to the water and cultured buttermilk. Trial B was performed four times: twice (Set 1) with the xanthan gum blended with sugar prior to adding it to the water and cultured buttermilk, and twice (Set 2) with xanthan gum alone (i.e., no sugar blend). Set 1 and Set 2 were each performed under the hot process conditions and the cold process conditions described above.

Trial C:

Trial C had the same ingredients added in the same order as described for Trial A, except that the xanthan gum was added directly to the water as the first step in the process. Trial C was performed four times: twice with the xanthan gum alone added to the water (Set 1), and twice with the xanthan gum added to the water as a xanthan gum/sugar blend (Set 2). Set 1 and Set 2 were each performed under the hot process conditions and the cold process conditions described above.

The order of addition of the xanthan gum during the process had an effect upon the viscosity of the food product dressings. Higher viscosities were achieved when xanthan gum was added earlier in the process prior to adding other system solutes. Although not wishing to limited by theory, this effect may be the result of a competition between xanthan gum and the other system solutes for available water. Thus, it appears that the sooner the xanthan gum is added to the water mixture, the more effective is its water binding and thus the higher the resulting viscosity of the final product. The manner in which the xanthan gum is added to the system (i.e., alone or in a blend with sugar) also had an effect upon the final viscosity of the food product dressings. Using a xanthan gumn/sugar blend results in a lower dressing viscosity. Again not wishing to be limited by theory, this effect is also probably related to the competition between the xanthan gum and the sugar for available water. Finally, the processing temperature had a significant effect upon the viscosity of the dressings. The so-called cold process conditions (i.e., buttermilk added at about 40° F.) resulted in higher final or bulk viscosities of the resulting dressing products. The so-called hot process conditions (i.e., buttermilk added at about 175° F.) resulted in significantly lower final or bulk viscosities of the resulting dressing products. The effect due to temperature was more significant than either of the other variables examined (i.e., order of addition or form of xanthan gum).

While the present invention has been described herein with some specificity, and with reference to certain preferred embodiments thereof, those of ordinary skill in the art will recognize numerous variations, modifications and substitutions of that which has been described which can be made, and which are within the scope and spirit of the invention. It is intended that all of these modifications and variations be within the scope of the present invention as described and claimed herein, and that the invention be limited only by the scope of the claims which follow, and that such claims be interpreted as broadly as is reasonable. Throughout this application, various publications and books have been cited. The entireties of each of these publications and books are hereby incorporated by reference herein.

What is claimed is:

1. A food product dressing comprising an oil-in-water emulsion, wherein the oil-in-water emulsion is prepared by a process comprising:

(a) preparing a composition comprising:
(1) from about 0.15 to about 1.0 weight percent of a suspending agent;
(2) from about 0.5 to about 25 weight percent of a dairy source, wherein the temperature of the dairy source ranges from about 35° F. to about 80° F.;
(3) from about 0.05 to about 3.5 weight percent of an edible acid, wherein the edible acid maintains the pH of the food product dressing at less than about 4.0;
(4) from about 0 to about 0.5 weight percent of an emulsifier;
(5) from about 15 to about 95 weight percent of water, wherein the temperature of the water ranges from about 35° F. to about 80° F.;
(6) from about 0.50 to about 5.0 weight percent of egg yolk;
(7) from about 0 to about 20 weight percent of a sweetener;
(8) from about 0 to about 10 weight percent of salt; and
(9) from about 0 to about 15 weight percent of spices and natural or artificial flavors, wherein the temperature of the composition remains from about 50° F. to about 80° F.;

(b) mixing the composition of (a) for a time period sufficient to hydrate the suspending agent, wherein the temperature during the mixing remains from about 50° F. to about 80° F.;

(c) adding from about 10 to about 80 weight percent of an oil to the mixed composition of (b) to form a pre-emulsion, wherein the temperature of the oil ranges from about 35° F. to about 80° F., and wherein the temperature of the mixed composition during the addition of the oil remains from about 50° F. to about 80° F.; and (d) emulsifying the pre-emulsion to form the oil-in-water emulsion, wherein the temperature during the formation of the oil-in-water emulsion remains from about 50° F. to about 80° F.

2. A food product dressing as defined in claim 1, wherein the composition prepared in step (a) comprises:

(1) from about 0.2 to about 0.5 weight percent of the suspending agent;

(2) from about 1.0 to about 15 weight percent of the dairy source;

(3) from about 0.1 to about 2 weight percent of the edible acid;

(4) from about 0.05 to about 0.3 weight percent of the emulsifier;

(5) from about 20 to about 80 weight percent of water;

(6) from about 3.0 to about 5.0 weight percent of egg yolk;

(7) from about 2 to about 10 weight percent of the sweetener;

(8) from about 1 to about 5 weight percent of salt; and (9) from about 2 to about 10 weight percent of spices and natural or artificial flavors.

3. A food product dressing as defined in claim 2, wherein the temperature in step (b) remains from about 60° F. to about 75° F. and wherein the temperature in step (d) remains from about 60° F. to about 75° F.

4. A food product dressing as defined in claim 3, wherein the oil-in-water emulsion has a bulk viscosity of about 6000 to about 12000 centipoises at room temperature.

5. A food product dressing as defined in claim 4, wherein the bulk viscosity of the oil-in-water emulsion is in the range of about 7500 to about 8500 centipoises.

6. A food product dressing as defined in claim 1, wherein the temperature in step (b) remains from about 60° F. to about 75° F. and wherein the temperature in step (d) remains from about 60° F. to about 75° F.

7. A food product dressing as defined in claim 6, wherein the oil-in-water emulsion has a bulk viscosity of about 6000 to about 12000 centipoise at room temperature.

8. A food product dressing as defined in claim 7, wherein the bulk viscosity of the oil-in-water emulsion is in the range of about 7500 to about 8500 centipoises.

9. A method for preparing a food product dressing comprising an oil-in-water emulsion, said method comprising:

(a) preparing a composition comprising:

(1) from about 0.15 to about 1.0 weight percent of a suspending agent;

(2) from about 0.5 to about 25 weight percent of a dairy source, wherein the temperature of the dairy source ranges from about 35° F. to about 80° F.;

(3) from about 0.05 to about 3.5 weight percent of an edible acid, wherein the edible acid maintains the pH of the dressing at below about 4.0;

(4) from about 0 to about 0.5 weight percent of an emulsifier;

(5) from about 15 to about 95 weight percent of water, wherein the temperature of the water ranges from about 35° F. to about 80° F.;

(6) from about 0.5 to about 5.0 weight percent of egg yolk;

(7) from about 0 to about 20 weight percent of sugar;

(8) from about 0 to about 10 weight percent of salt; and (9) from about 0 to about 15 weight percent of spices and natural or artificial flavors, wherein the temperature of the composition remains from about 50° F. to 80° F.;

(b) mixing the composition of (a) for a time period sufficient to hydrate the suspending agent, wherein the temperature during the mixing remains from about 50° F. to about 80° F.;

(c) adding from about 10 to about 80 weight percent of an oil to the mixed composition of (b) to form a pre-emulsion, wherein the temperature of the oil ranges from about 35° F. to about 80° F., and wherein the temperature of the mixed composition during the addition of the oil remains from about 50° F. to about 80° F.; and (d) emulsifying the pre-emulsion to form the oil-in-water emulsion, wherein the temperature during the formation of the oil-in-water emulsion remains from about 50° F. to about 80° F.

10. A method as defined in claim 9, wherein the composition prepared in step (a) comprises:

(1) from about 0.2 to about 0.5 weight percent of the suspending agent;

(2) from about 1.0 to about 15 weight percent of the dairy source;

(3) from about 0.1 to about 2 weight percent of the edible acid;

(4) from about 0.05 to about 0.3 weight percent of the emulsifier;

(5) from about 20 to about 80 weight percent of water;

(6) from about 3.0 to about 5.0 weight percent of egg yolk;

(7) from about 2 to about 10 weight percent of the sweetener;

(8) from about 1 to about 5 weight percent of salt; and (9) from about 2 to about 10 weight percent of spices and natural or artificial flavors.

11. A method as defined in claim 10, wherein the temperature in step (b) remains from about 60° F. to about 75° F. and wherein the temperature in step (d) remains from about 60° F. to about 75° F.

12. A method as defined in claim 11, wherein the oil-in-water emulsion has a bulk viscosity of about 6000 to about 12000 centipoise at room temperature.

13. A method as defined in claim 12, wherein the bulk viscosity of the oil-in-water emulsion is in the range of about 7500 to about 8500 centipoise.

14. A method as defined in claim 9, wherein the temperature in step (b) remains from about 60° F. to about 75° F. and wherein the temperature in step (d) remains from about 60° F. to about 75° F.

15. A method as defined in claim 14, wherein the oil-in-water emulsion has a bulk viscosity of about 6000 to about 12000 centipoise at room temperature.

16. A method as defined in claim 15, wherein the bulk viscosity of the oil-in-water emulsion is in the range of about 7500 to about 8500 centipoise.

17. A method for preparing a food product dressing comprising an oil-in-water emulsion, said method comprising:

(a) preparing a composition comprising:
   (1) from about 0.15 to about 1.0 weight percent of a suspending agent;
   (2) from about 0.5 to about 25 weight percent of a diary source, wherein the temperature of the dairy source ranges from about 35° F. to about 80° F.;
   (3) from about 0.05 to about 3.5 weight percent of an edible acid, wherein the edible acid maintains the pH of the dressing at below about 4.0;
   (4) from about 15 to about 95 weight percent of water, wherein the temperature of the water ranges from about 35° F. to about 80° F.; and
   wherein the temperature of the composition remains from about 50° F. to about 80° F.;
(b) mixing the composition of (a) for a time period of time sufficient to hydrate the suspending agent, wherein the temperature during the mixing remains from about 50° F. to about 80° F.;
(c) adding from about 10 to about 80 weight percent of an oil to the mixed composition of (b) to form a pre-emulsion, wherein the temperature of the oil ranges from about 35° F. to about 80° F., and wherein the temperature mixed composition during the addition remains from about 50° F. to about 80° F.; and
(d) emulsifying the pre-emulsion to form an oil-in-water emulsion, wherein the temperature during the formation of the oil-in-water emulsion remains from about 50° F. to about 80° F.

18. A method as defined in claim 17, wherein the composition prepared in step (a) comprises:
   (1) from about 0.2 to about 0.5 weight percent of the suspending agent;
   (2) from about 1.0 to about 15 weight percent of the dairy source;
   (3) from about 0.1 to about 2 weight percent of the edible acid;
   (4) from about 20 to about 80 weight percent of water; and further comprises:
   (5) from about 0.05 to about 0.3 weight percent of the emulsifier;
   (6) from about 3.0 to about 5.0 weight percent of egg yolk;
   (7) from about 2 to about 10 weight percent of a sweetener;
   (8) from about 1 to about 5 weight percent of salt; and
   (9) from about 2 to about 10 weight percent of spices and natural or artificial flavors.

19. A method as defined in claim 18, wherein the temperature in step (b) remains from about 60° F. to about 75° F. and wherein the temperature in step (d) remains from about 60° F. to about 75° F.

20. A method as defined in claim 18, wherein the oil-in-water emulsion has a bulk viscosity of about 6000 to about 12000 centipoise at room temperature.

21. A method as defined in claim 20, wherein the bulk viscosity of the oil-in-water emulsion is in the range of about 7500 to about 8500 centipoise.

22. A method as defined in claim 17, wherein the temperature in step (b) remains from about 60° F. to about 75° F. and wherein the temperature in step (d) remains from about 60° F. to about 75° F.

23. A method as defined in claim 17, wherein the oil-in-water emulsion has a bulk viscosity of about 6000 to about 12000 centipoise at room temperature.

24. A method as defined in claim 23, wherein the bulk viscosity of the oil-in-water emulsion is in the range of about 7500 to about 8500 centipoise.

25. A method for controlling the bulk viscosity in a pourable food dressing product, said method comprising:
   (a) preparing a composition at a temperature of about 50° F. to about 80° F., said composition comprising:
      (1) from about 0.15 to about 1.0 weight percent of a suspending agent;
      (2) from about 0.5 to about 25 weight percent of a dairy source, wherein the temperature of the dairy source ranges from about 35° F. to about 80° F.;
      (3) from about 0.05 to about 3.5 weight percent of an edible acid, wherein the edible acid maintains the pH of the pourable dressing product at below about 4.0;
      (4) from about 0.05 to about 0.5 weight percent of an emulsifier;
      (5) from about 15 to about 95 weight percent of water, wherein the temperature of the water ranges from about 35° F. to about 80° F.;
      (6) from about 0.5 to about 5.0 weight percent of egg yolk;
      (7) from about 0 to about 20 weight percent of sugar;
      (8) from about 0 to about 10 weight percent of salt; and
      (9) from about 0 to about 15 weight percent of spices and natural or artificial flavors,
   (b) mixing the composition of (a) for a period of time sufficient to hydrate the suspending agent while maintaining the temperature of the composition during the duration of the mixing at about 50° F. to about 80° F.;
   (c) adding from about 10 to about 80 weight percent of an oil to the mixed composition of (b) to form a pre-emulsion, wherein the temperature of the oil ranges from about 35° F. to about 80° F., and wherein the temperature of the mixed composition during the addition remains from about 50° F. and to 80° F.; and
   (d) treating the pre-emulsion to form an pourable dressing product which is an oil-in-water emulsion, wherein the temperature during the formation of the oil-in-water emulsion remains from about 50° F. to about 80° F.;
   whereby the control of the temperature during the method within the range of about 50° F. to about 80° F. allows the bulk viscosity of the pourable dressing product to be controlled.

26. A method as defined in claim 25, wherein the composition prepared in step (a) comprises:
   (1) from about 0.2 to about 0.5 weight percent of the suspending agent;
   (2) from about 1.0 to about 15 weight percent of the dairy source;
   (3) from about 0.1 to about 2 weight percent of the edible acid;
   (4) from about 0.05 to about 0.3 weight percent of the emulsifier;
   (5) from about 20 to about 80 weight percent of water;
   (6) from about 3.0 to about 5.0 weight percent of egg yolk;
   (7) from about 2 to about 10 weight percent of the sweetener;
   (8) from about 1 to about 5 weight percent of salt; and
   (9) from about 2 to about 10 weight percent of spices and natural or artificial flavors.

27. A method as defined in claim 26, wherein the temperature in step (b) remains from about 60° F. to about 75° F. and wherein the temperature in step (d) remains from about 60° F. to about 75° F.

28. A method as defined in 27, wherein the oil-in-water emulsion has a bulk viscosity of about 6000 to about 12000 centipoise at room temperature.

29. A method as defined in claim 28, wherein the bulk viscosity of the oil-in-water emulsion is in the range of about 7500 to about 8500 centipoise.

30. A method as defined in claim 25, wherein the temperature in step (b) remains from about 60° F. to about 75° F. and wherein the temperature in step (d) remains from about 60° F. to about 75° F.

31. A method as defined in claim 30, wherein the oil-in-water emulsion has a bulk viscosity of about 6000 to about 12000 centipoise at room temperature.

32. A method as defined in claim 31, wherein the bulk viscosity of the oil-in-water emulsion is in the range of about 7500 to about 8500 centipoise.

33. A pourable food dressing product comprising an oil-in-water emulsion containing:
   (1) from about 0.15 to about 1.0 weight percent of a suspending agent;
   (2) from about 0.5 to about 25 weight percent of a dairy source;
   (3) from about 0.05 to about 3.5 weight percent of an edible acid, wherein the edible acid maintains the pH of the pourable food dressing product at below about 4.0;
   (4) from about 0.05 to about 0.5 weight percent of an emulsifier;
   (5) from about 15 to about 95 weight percent of water;
   (6) from about 0.5 to about 5.0 weight percent of egg yolk;
   (7) from about 10 to about 80 weight percent of an oil;
   (8) from about 0 to about 20 weight percent of sugar;
   (9) from about 0 to about 10 weight percent of salt; and
   (10) from about 0 to about 15 weight percent of spices and natural or artificial flavors,
      wherein the oil-in-water emulsion has a bulk viscosity at room temperature of about 6000 to about 12000 centipoise.

34. A pourable food dressing product as defined in claim 33, wherein the oil-in-water emulsion contains:
   (1) from about 0.2 to about 0.5 weight percent of the suspending agent;
   (2) from about 1.0 to about 15 weight percent of the dairy source;
   (3) from about 0.1 to about 2.0 weight percent of the edible acid;
   (4) from about 0.05 to about 0.3 weight percent of the emulsifier;
   (5) from about 15 to about 95 weight percent of water;
   (6) from about 3 to about 5 weight percent of egg yolk;
   (7) from about 25 to about 65 weight percent of the oil;
   (8) from about 2 to about 10 weight percent of sugar;
   (9) from about 1 to about 5 weight percent of salt; and
   (10) from about 2 to about 10 weight percent of spices and natural or artificial flavors;
      wherein the oil-in-water emulsion has a bulk viscosity at room temperature of about 7500 to about 8500 centipoise.

* * * * *